United States Patent [19]

Glaser et al.

[11] E Re. 30,773

[45] Reissued Oct. 13, 1981

[54] TRANSACTION TERMINAL

[75] Inventors: Paul F. Glaser, Culver City; Richard J. Orford, Hermosa Beach, both of Calif.

[73] Assignee: Transaction Technology, Inc., Los Angeles, Calif.

[21] Appl. No.: 91,509

[22] Filed: Nov. 5, 1979

Related U.S. Patent Documents

Reissue of:

[64] Patent No.: 4,134,537
Issued: Jan. 16, 1979
Appl. No.: 790,764
Filed: Apr. 25, 1977

[51] Int. Cl.[3] ..... G06F 15/30; G07F 7/08

[52] U.S. Cl. ..... 235/379; 235/381

[58] Field of Search ..... 235/379, 380, 381, 419; 364/406; 340/149 R, 149 A, 152 R

[56] References Cited

U.S. PATENT DOCUMENTS

| | | | |
|---|---|---|---|
| 3,845,277 | 10/1974 | Voss et al. | 364/206 |
| 3,876,864 | 4/1975 | Clark et al. | 340/149 A |
| 3,996,448 | 12/1976 | Anderson et al. | 235/419 |

OTHER PUBLICATIONS

Sales Literature "NCR 700 Self Service Financial Terminal"-NCR's identification SP-1380 0774; SP-1381 0474.

Publication of Datapro Research Corp. re NCR Self-Service Financial Terminal, 5 pp., Dec. 1978, Datapro Research Corp., Delran, N.J. 08075.

"Design of Man-Computer Dialogues" by James Martin, pp. 380-384, 1973, Prentice-Hall, Inc., Englewood Cliffs, N.J.

Sales Literature "FDS/i Automated Modular Teller/875 System"-FDS/i identification 035012-010. FDS/i Financial Data Sciences, Inc., 3606 Silver Star Road, Orlando, Florida 32808.

*Primary Examiner*—Daryl W. Cook
*Attorney, Agent, or Firm*—Charles H. Schwartz; Ellsworth R. Roston

[57] ABSTRACT

A terminal for providing for the performance of transactions by a user on a step by step basis and with the terminal, including, a visual display for displaying to the user at specific steps in a transaction instructional text to the user for the performance by the user to advance the transaction on a step by step basis, a plurality of function selectors located adjacent the visual display and with each selector corresponding to the location of particular instructional text on the visual display, the visual display including at particular ones of the steps in a transaction instructional text including a choice of one or one of a plurality of the function selectors to advance the transaction to the next step, and means coupled to the function selectors for enabling and/or visually indicating only those selectors which are part of the choice for a particular one of the steps.

74 Claims, 12 Drawing Figures

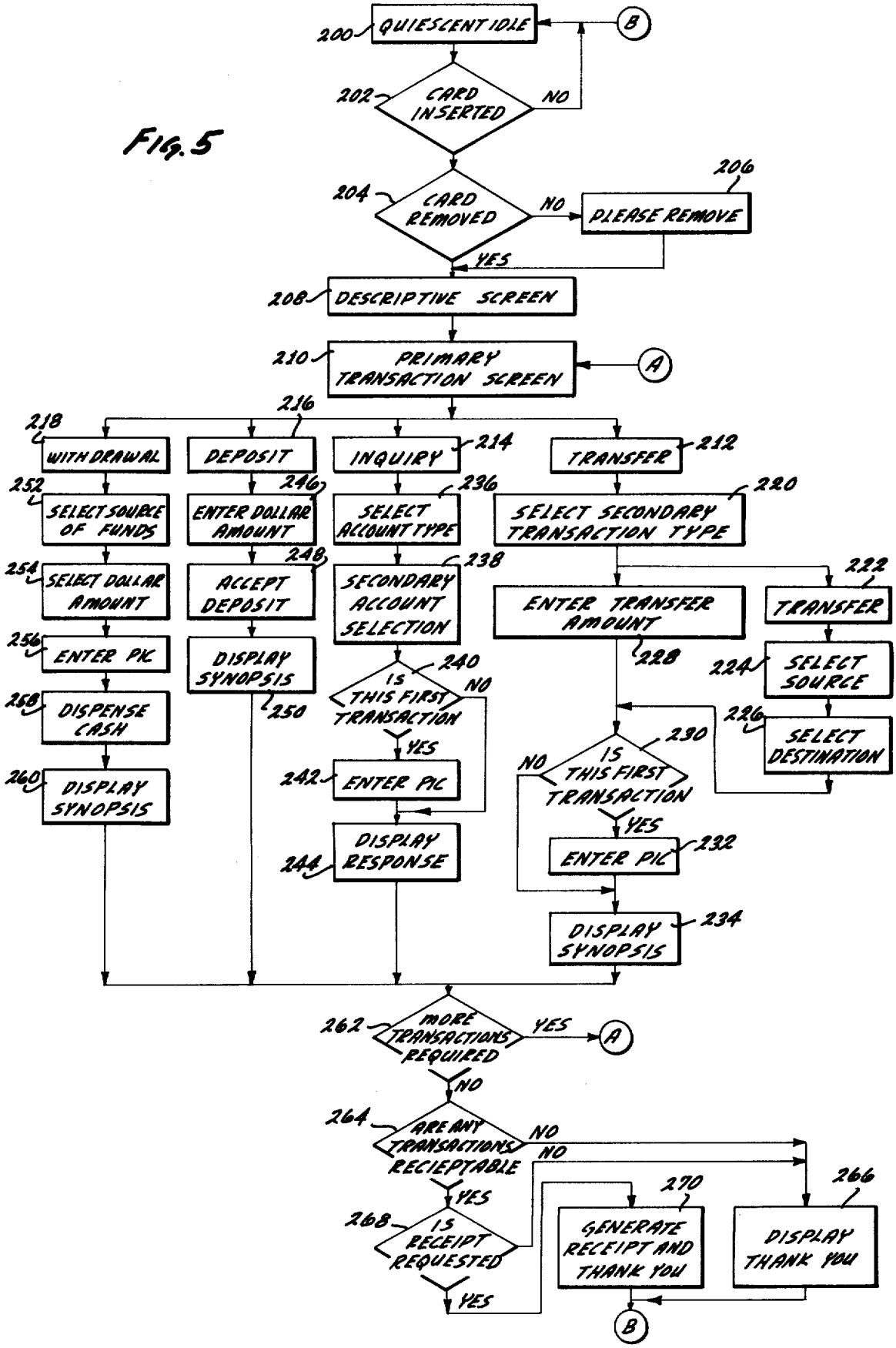
FIG. 5
200 QUIESCENT IDLE
B
202 CARD INSERTED
NO
204 CARD REMOVED
NO
206 PLEASE REMOVE
YES
208 DESCRIPTIVE SCREEN
210 PRIMARY TRANSACTION SCREEN
A
218 WITHDRAWAL
216 DEPOSIT
INQUIRY 214
TRANSFER 212
252 SELECT SOURCE OF FUNDS
246 ENTER DOLLAR AMOUNT
236 SELECT ACCOUNT TYPE
220 SELECT SECONDARY TRANSACTION TYPE
254 SELECT DOLLAR AMOUNT
248 ACCEPT DEPOSIT
238 SECONDARY ACCOUNT SELECTION
ENTER TRANSFER AMOUNT
222 TRANSFER
256 ENTER PIC
DISPLAY SYNOPSIS
240 IS THIS FIRST TRANSACTION
NO
228
224 SELECT SOURCE
258 DISPENSE CASH
250
226 SELECT DESTINATION
YES
230 IS THIS FIRST TRANSACTION
NO
260 DISPLAY SYNOPSIS
242 ENTER PIC
YES
ENTER PIC 232
244 DISPLAY RESPONSE
DISPLAY SYNOPSIS 234
262 MORE TRANSACTIONS REQUIRED
YES
A
NO
264 ARE ANY TRANSACTIONS RECIEPTABLE
NO
NO
YES
270
266
268 IS RECEIPT REQUESTED
GENERATE RECEIPT AND THANK YOU
DISPLAY THANK YOU
YES
B B
WOULD YOU LIKE A RECEIPT?
YES
NO
TO START OVER
C
YOUR RECEIPT WILL BE READY SHORTLY
TO START OVER
D
HERE IS YOUR RECEIPT THANKS
WE'RE HAPPY TO SERVE YOU AT THE BANK
TO START OVER
A
OKAY!
THANKS
WE'RE HAPPY TO SERVE YOU AT THE BANK
TO START OVER

TRANSACTION TERMINAL

Matter enclosed in heavy brackets [ ] appears in the original patent but forms no part of this reissue specification; matter printed in italics indicates the additions made by reissue.

The present invention is directed to a transaction terminal which may be customer activated and with the terminal incorporating a control and display console for providing for a plurality of customer activated transactions such as banking transactions.

Specifically, the terminal of the present invention may be initially activated by a credit card or by other means and the terminal could be available twenty-four hours per day to provide for the transactions. The terminal will allow customers to easily and efficiently perform typical transactions without the assistance of any banking personnel. The terminal could also be used by banking personnel such as a teller and with the teller able to perform a number of transactions without leaving a particular station position.

In the case of the terminal being operated by the customer, the customer can perform fairly complicated transactions such as withdrawals of cash or travelers checks, deposits, transfers between accounts or for paying bills, inquiries, credit authorization, etc., all without the assistance of banking personnel. The terminal and specifically the control and display console incorporated in the terminal is designed for maximum likelihood that the user of the terminal can perform the transaction in an error free manner. The user of the terminal should, in a great majority of cases, be able to perform the transaction the first time without an error even if the user has never operated the terminal before. Moreover, even if an error is made, the terminal is designed so that the user can be successfully prompted by displayed messages on the console so as to complete the transaction or to complete the transaction on a subsequent attempt. In the vast majority of cases, the customer will be able to perform complicated banking transactions in privacy without the necessity of assistance from individuals such as banking personnel.

The terminal of the present invention may include a security chest which is used to house all components of the terminal system that may need to be maintained in a secured location. For example, the terminal may include a supply of cash and a cash dispensing mechanism and may also include a depository for receiving customer deposits. These components would then be located within the security chest. In addition, the main control electronics for the terminal such as a microprocessor and also any control electronics for components located within the security chest may also be located within the security chest so as to prevent any unauthorized access to the control electronics. In addition to the components of the terminal system located within the security chest, a number of components may be located outside the security chest. For example, the terminal may include a receipt printer and this component may be located in an auxiliary module located outside the security chest. Other components of the system such as power supplies and maintenance components may also be located within this auxiliary module.

The terminal of the present invention need not include a security chest if the environment does not warrant it. Furthermore any or any combination of the above functions may be deleted from the terminal depending on application needs.

In addition to the above, the terminal of the present invention includes a control and display console which is located at a position at the front of the terminal so that the console may be used by a user such as a customer to perform a transaction such as a banking transaction. For example, the console may include a cash delivery mechanism to provide access from the cash dispenser which dispenser is used to provide for the dispensing of cash or travelers checks from the security position within the security chest to an external position on the console so as to dispense cash to the customer. The console may also include a depository mechanism which mechanism provides access to the depository within the security chest so that deposits may be deposited from a position exterior of the security chest by the customer. In addition, the console may provide for a receipt to the customer when appropriate from a receipt delivery mechanism.

A major portion of the console is a control and display panel which panel is used by the user of the terminal to complete a series of steps to provide for a complete transaction. The control and display panel normally includes a card reader which may be used to activate the terminal for use by the customer. However, other means may also be used to activate the terminal or the terminal may be continuously maintained active in appropriate applications. The control and display panel additionally includes a video display which is the main means of communication between the customer and the terminal. In addition, a key pad is used as an entry keyboard by the customer. For example, the key pad may be used by the customer to enter a personal identification code as further authorization for the completion of a transaction, enter money amounts where required, and enter other account information when necessary.

To one side of the video display are a plurality of function switches which are formed as backlighted selector buttons. These function switches are used in particular ones of the steps of a transaction to allow the customer to respond to a direction or to a choice presented by the terminal. For example, the control display panel may include a group of five of these selector buttons and with each button associated with a display position on the video display. Specifically, each button lines up with specific rows of display information on the video display. The display information opposite each button indicates an appropriate choice for the customer. Only those buttons which may be selected by the customer are enabled by the terminal electronics and, in the particular example of the invention described, only those enabled buttons are illuminated so as to serve as indicators. An additional selector button may be used to start over a transaction. This button also is enabled when appropriate and is illuminated when so enabled to serve as an indicator.

The enabling of particular selector buttons associated with the video display and wherein only those buttons which can be chosen are enabled and with those buttons additionally illuminated provides for a method of taking a customer through a transaction in an error free manner. For example, a customer may wish to perform a transaction wherein at one step the customer is to select one of three possible choices. The text at three different positions on the video display provides for these three choices and with the selector buttons associated with each position of text enabled and illuminated so that the customer can only select one of the three enabled buttons. As a further visual aid to the customer, arrows may extend on the video display from the different text positions to each appropriate button. The customer then determines, after reading the text, which of the three choices is desired for that step in the particular transaction and pushes the corresponding selector button.

In the next step of the transaction, the customer may again have to select one from another group of choices so that the text now reflects these choices and with associated buttons enabled and illuminated to provide for a further selection by the customer. The control and display panel therefore allows the customer to go from step to step in a transaction and with the customer having to select one from a plurality of buttons at appropriate ones of the steps and with each step wherein a selection is necessary having the possible selections displayed on the video display and with the appropriate selector buttons enabled and illuminated and with the customer selecting the desired one of such enabled and illuminated buttons to advance to the next step in the transaction.

In the prior art, automatic banking equipment has been provided wherein a video display has provided for instructions to a customer. When a selection is necessary, this is displayed on the video display and the customer is directed to depress a particular code or key. The customer than has to press a key or keys which are part of a key pad in correspondence to the specific code or key identified on the video screen. Normally, all of the keys on the key pad are enabled and there is no alignment with the text on the video display.

In addition, in the prior art, there have been visual display systems for accessing selected data wherein the data to be selected is presented on a video screen and with a plurality of selection switches aligned with specific lines of data on the video screen. The user of the equipment then chooses specific data to be accessed and with more and more details of this data accessed in accordance with successive actuations of the individual ones of the selection switches. This type of system, however, was not used to lead a customer through a transaction and wherein at different steps in the transaction the customer must select from different numbers of choices.

The prior art did not provide for the enabling and illumination of particular ones of selector switches so as to ensure that the user is only selecting from within a particular group of choices. The present invention leads a customer through one of a number of different transactions and with each transaction having choices at different steps in the transaction and with the system providing for the display of these choices and with selector buttons associated with the display to allow the customer to select the desired choice in a manner so that the chances that the customer will make an error is greatly reduced. Moreover, even if the customer does make an error in a particular transaction, the terminal is so designed that the customer will be given information about the error so that the customer will be able to complete the transaction. Even if the transaction cannot be completed the first time, the customer should be able to complete the transaction the second time through without the necessity of bringing in banking personnel.

Other aspects of the present invention are the provision of such an error free transaction terminal as part of a sophisticated automatic banking terminal which terminal allows for a multiplicity of different transactions. For example, the terminal of the present invention may provide for the dispensing of cash or travelers checks to the customer, the acceptance of deposits from the customer, the transferring of monies between accounts, or for the payment of various types of bills and the providing of various types of information upon inquiry. The terminal of the present invention, therefore, can greatly assist in the service provided to customers by a bank and can provide for these banking services at locations remote from the bank.

As additional examples of the versatility of the present invention, the terminal may be located in residential areas such as lobbies of apartment houses or hotels or in shopping areas such as stores or malls. If the volume of business is sufficient, a terminal may be located at a company's offices. Additionally, the terminal may be located in a retail store to provide for an electronic point of sale function and may be used to provide for a variety of functions. The terminal is very versatile since the terminal includes easily reprogrammable screens such as to text, position of text and sequence, function selectors such as enabling and illuminating, all of which provides for the ability to add, delete or enhance the functional capability of the terminal. This flexibility can be used to enhance the accessibility of the terminal by function, location and may even provide for multilingual operation of the terminal.

A clearer understanding of the invention will be had with reference to the following description and drawings wherein FIG. 1 is a front perspective view of a customer activated terminal including a control and display console;

FIG. 5 is a flow chart showing the operation of the customer activated terminal of the present invention;

Figure 6:
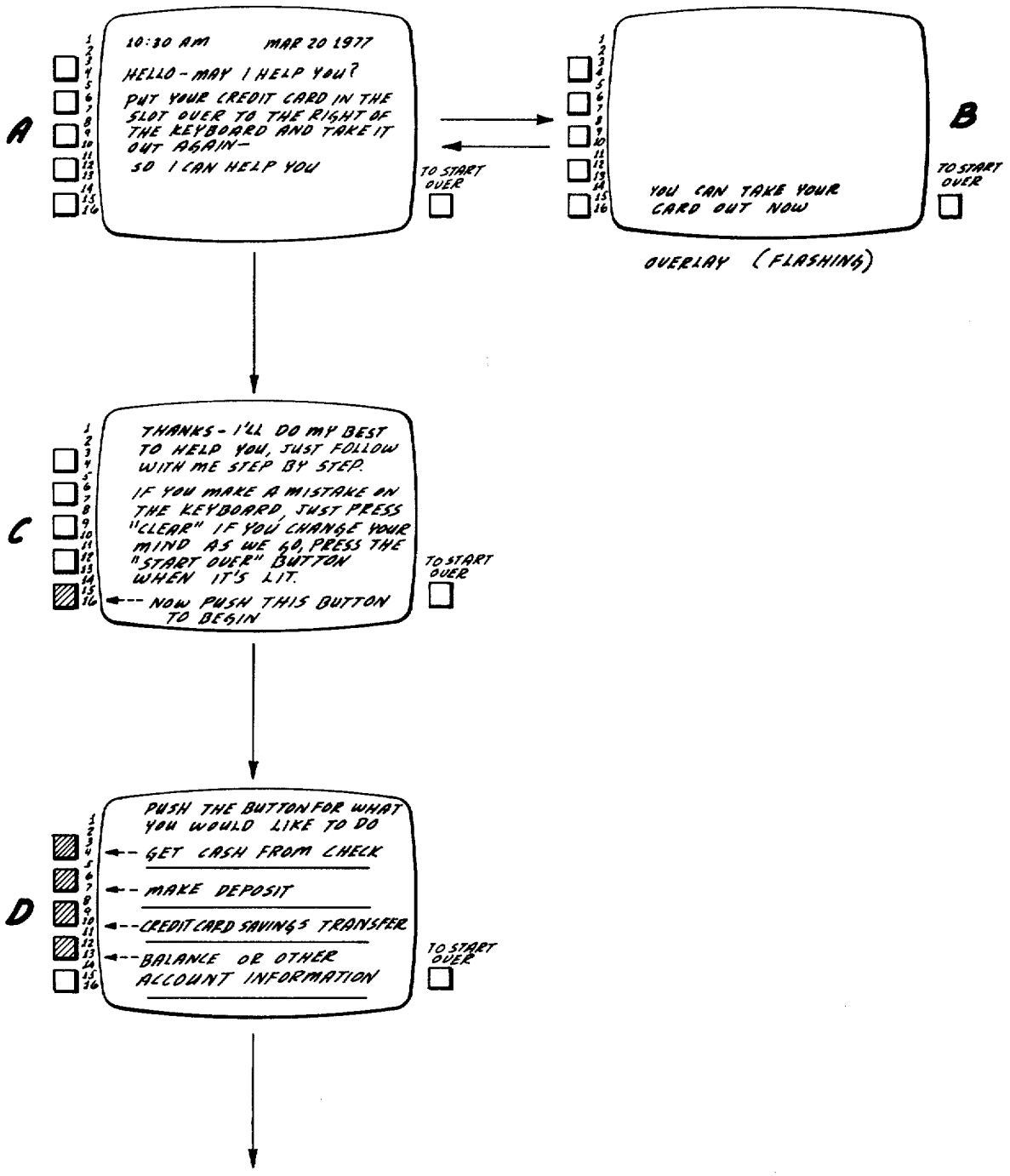
Figure 7:
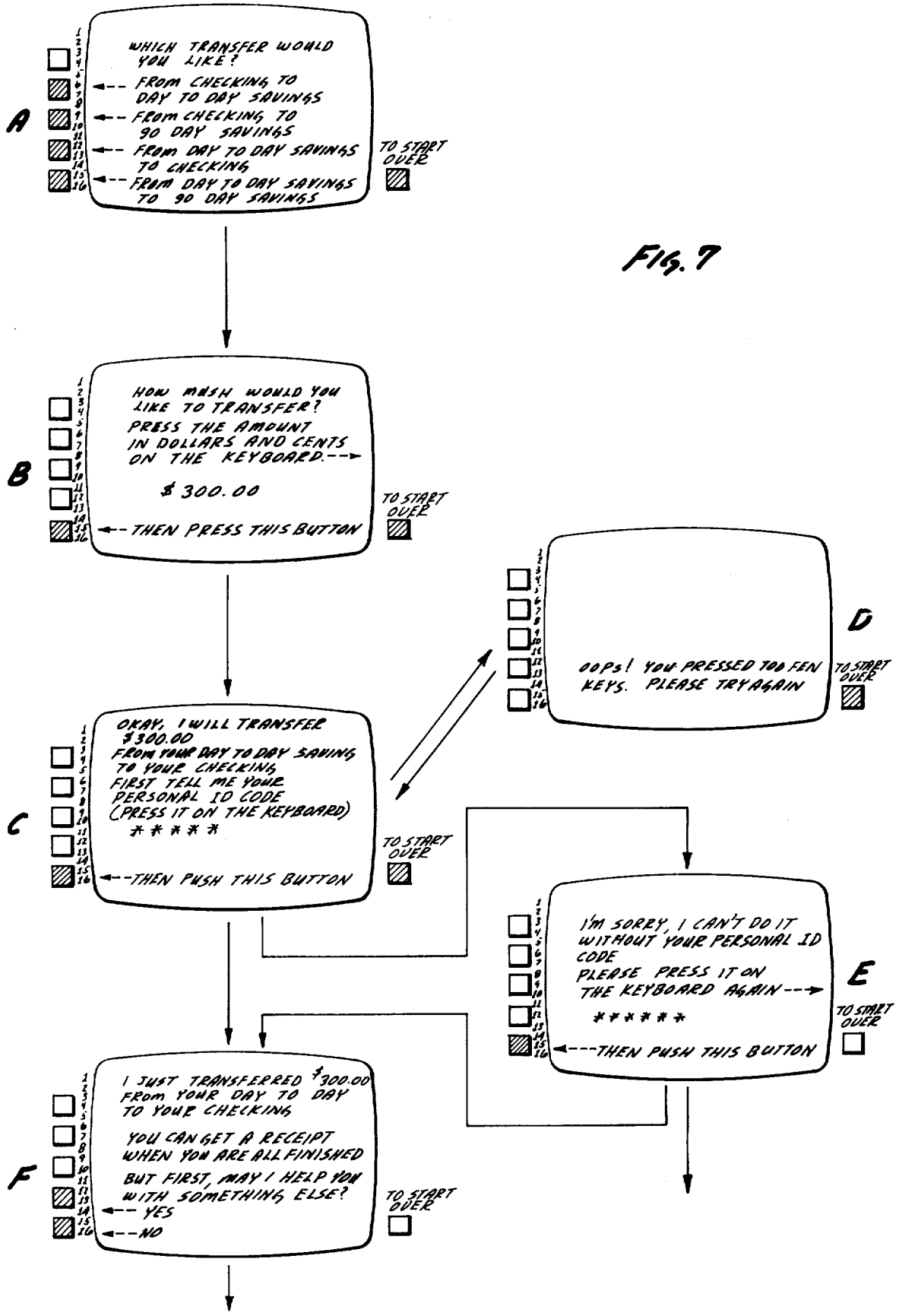
Figure 8:
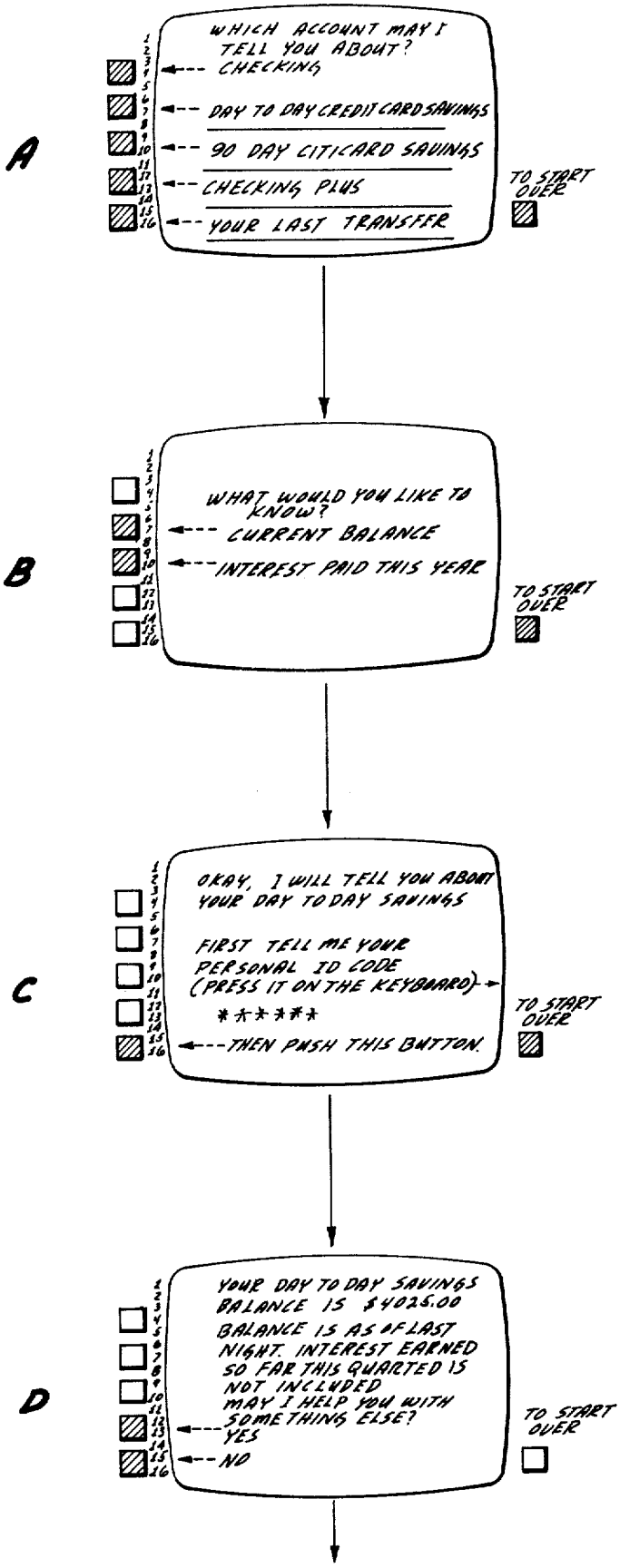
Figure 9:
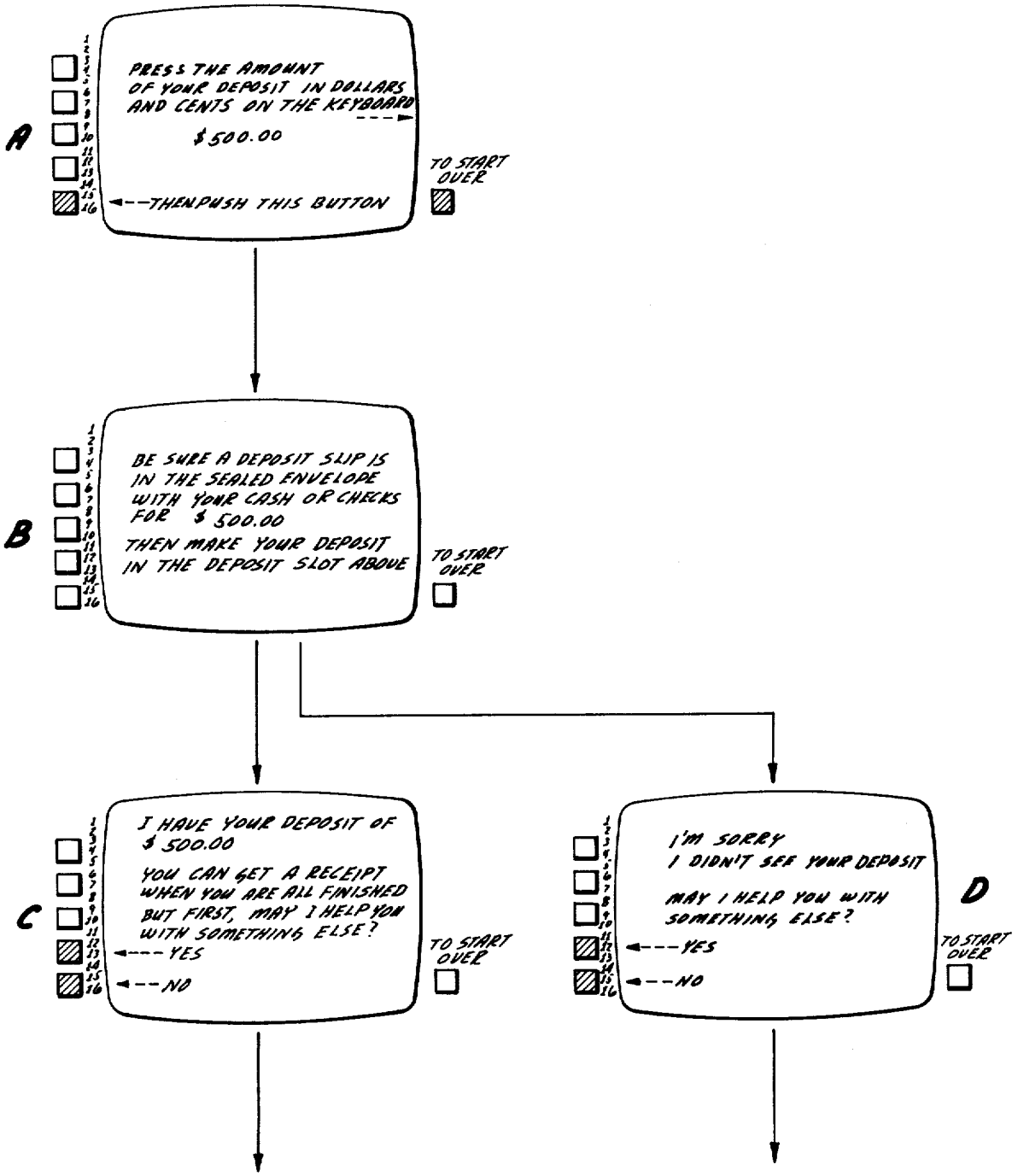
Figure 10:
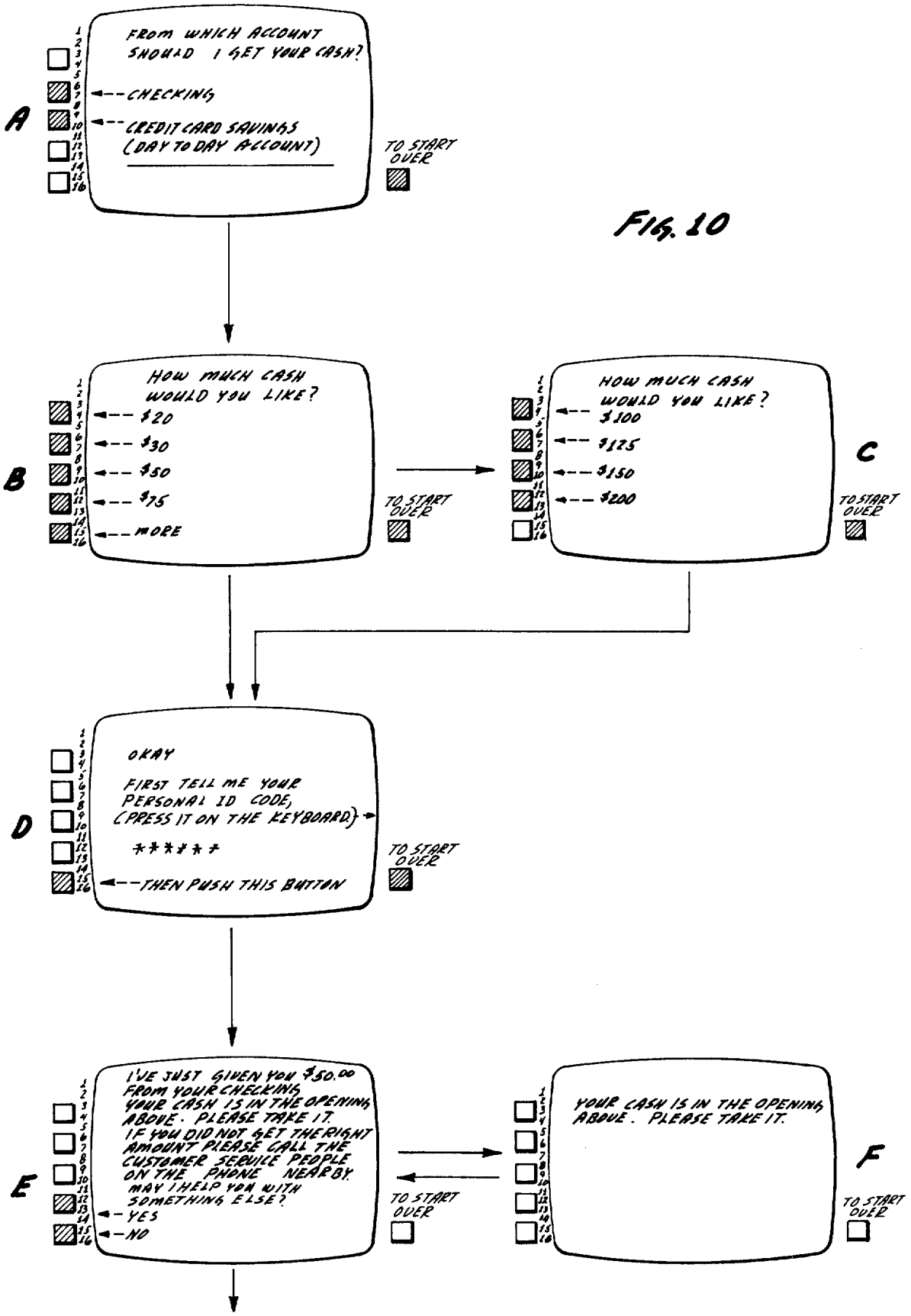
Figure 11:
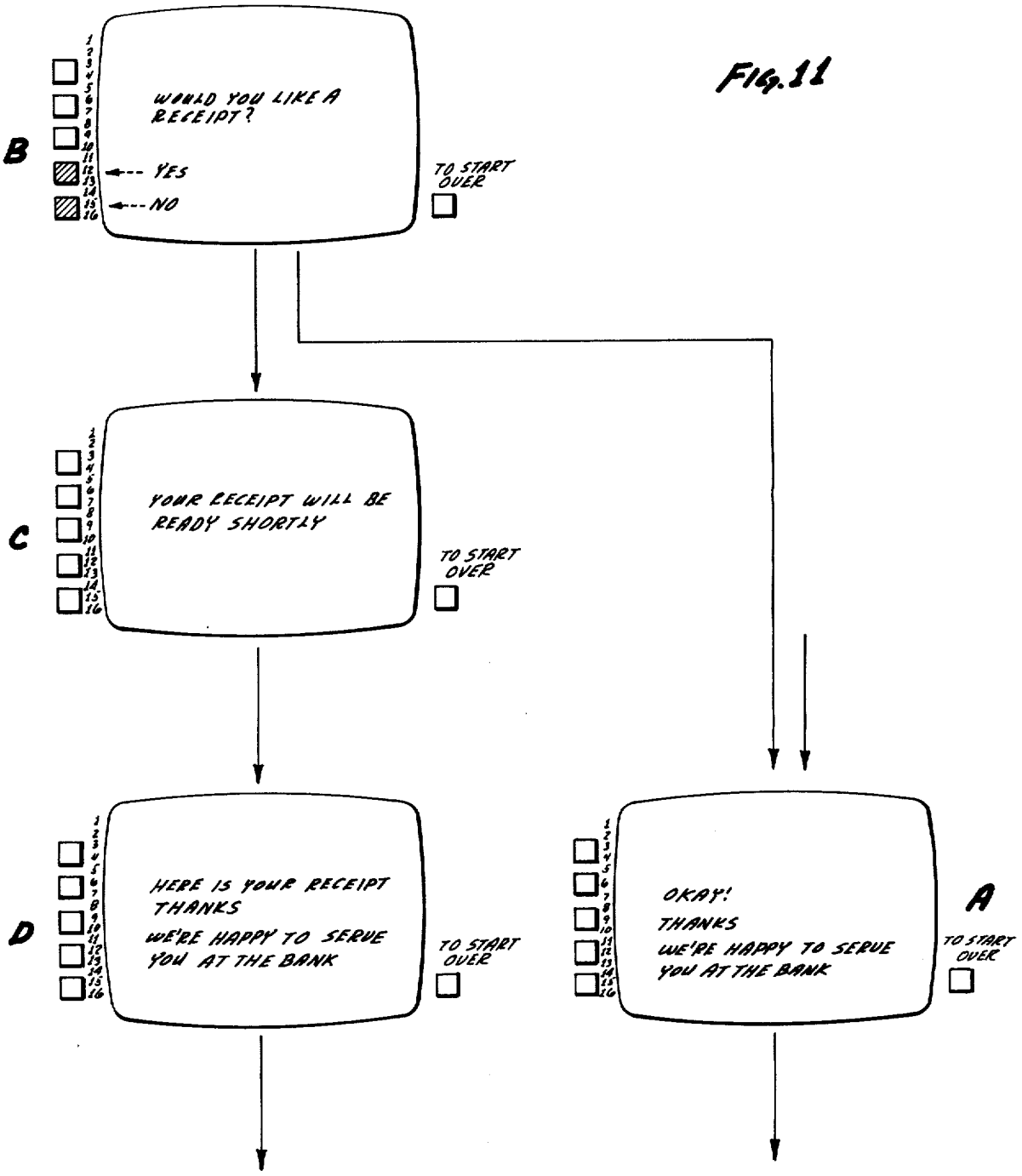
Figure 12:
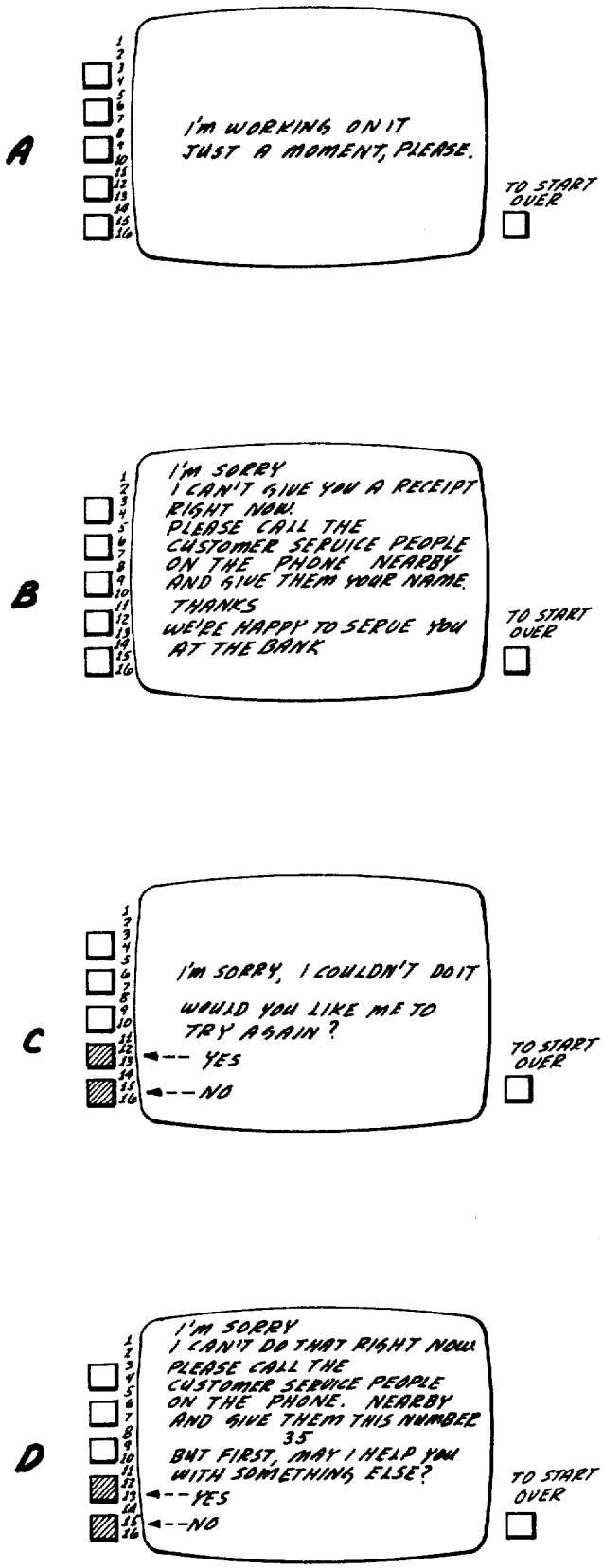

FIG. 6, consisting of A through D, illustrates a series of screens for presentation by the video display and selector buttons and showing the preliminary series of steps to be performed prior to all the transactions performed with the customer activated terminal of the present invention;

FIG. 7, consisting of A through F, illustrates a series of screens for presentation by the video display and selector buttons and showing the series of steps to be performed for a typical transfer transaction;

FIG. 8, consisting of A through D illustrates a series of screens for presentation by the video display and selector buttons and showing the series of steps to be performed for a typical inquiry transaction;

FIG. 9, consisting of A through D, illustrates a series of screens for presentation by the video display and selector buttons and showing the series of steps to be performed for a typical deposit transaction;

FIG. 10, consisting of A through F, illustrates a series of screens for presentation by the video display and selector buttons and showing the series of steps to be performed for a typical cash withdrawal transaction;

FIG. 11, consisting of A through D, illustrates a series of screens for presentation by the video display and selector buttons and showing the final sequence of steps to be performed for concluding all of the transactions performed by the customer activated terminal of the present invention; and FIG. 12, consisting of A through D, illustrates a number of screens for presentation by the video display and selector buttons and showing examples of additional steps that may be included in different ones of the transactions performed by the customer activated terminal at appropriate times.

Figure 1:
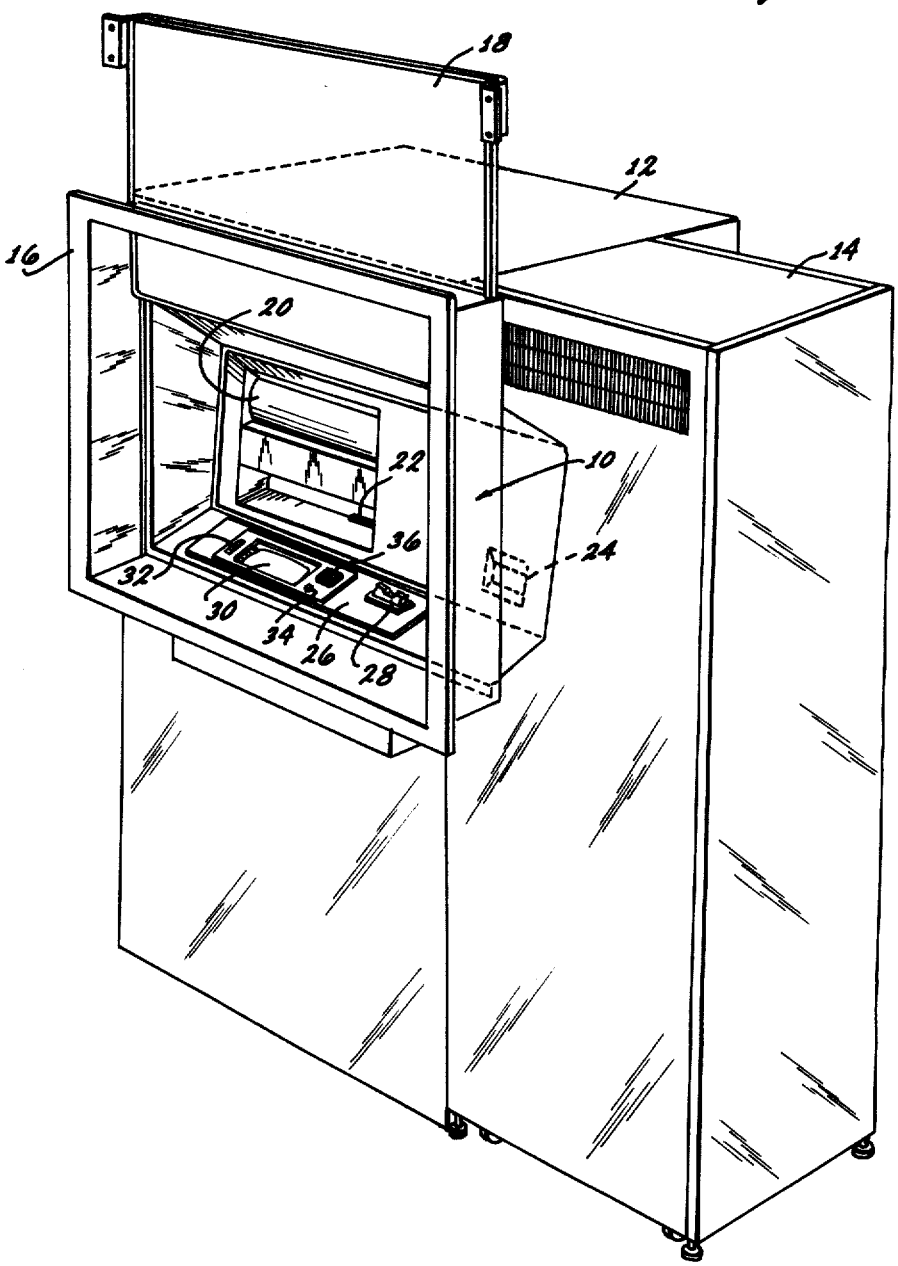

As seen in FIG. 1 the customer activated terminal of the present invention includes a control and display console generally designated by reference numeral 10. The control and display console 10 is generally the portion of the terminal to which the customer has access for providing a control of a transaction on a step by step basis and which console includes a visual display for feedback of instructions to the customer. Positioned behind the control and display console 10 and in physical communication with the console is a security chest 12 and an auxiliary module 14. The security chest 12 and the auxiliary module 14 may be mounted on one side of a wall (not shown) and with the control and display console positioned within an opening in the wall so that all the customer sees is the open portion of the control and display module framed by a wall bezel 16. The control and display console 10 may include a service shield 18 shown in the up position, which shield would be positioned behind the wall, so that in the position shown the various components of the control and display console 10 are presented for use by the customer. However, the service shield 18 may be lowered so as to close off the front of the control and display console 10 during servicing of the terminal.

Turning specifically to the control and display console, the console includes an opening for receiving an exterior portion of a cash delivery mechanism 20 which is used during an appropriate transaction to dispense cash to a customer from a position within the security chest 12. The console 10 also includes an opening for a depository mechanism 22 which is used to receive deposits from the customer for deposit within the security chest 12. A receipt opening 24 is also included so that a receipt which is generated for the customer may be dispensed through the opening 24 from a receipt printer. It can be seen that the receipt opening 24 is adjacent the auxiliary module 14 and normally the receipt printer itself is incorporated within the auxiliary module 14. Also, as indicated above, the opening for receiving the cash delivery mechanism 20 and the depository mechanism 22 are adjacent the security chest 12 so that any monies before being dispensed and any deposits received are contained within the security chest 12.

The console 10 includes a control and display panel 26 which serves as the means of communicating instructions to the customer so as to provide for a particular transaction on a step by step basis. The console 10 also allows the customer to enter information such as money amounts, a personal identification code or other account information when necessary. The control and display panel 26 includes a card reader 28 which may be used to provide the initial authorization for the terminal to start a transaction for a customer. The panel also includes a video display 30 which is used to display information to the customer and also to present directions and choices to the customer to enable the customer to go through a series of steps so as to perform a particular transaction. The panel also includes a plurality of general purpose function selector buttons 32 which buttons allow the customer to respond to the directions and choices presented by the terminal on the video display 30. A start-over button 34 may also be located adjacent the video display 30 in the same manner as the function selector buttons 32 and the start-over button is a special purpose function selector button.

The function selector buttons 32 are uniquely associated with the video display so that each button lines up with particular lines of display on the video display 30. Specifically, the lines of display opposite each button 32 may indicate an appropriate choice for the customer and only those buttons which may be chosen by the customer are enabled and illuminated. For example, at a particular step in a transaction, the customer may be presented with three choices and only three of the five buttons 32 shown in FIG. 1 would be enabled and illuminated and the customer could only choose from one of those three enabled and illuminated buttons. Finally, the control and display panel 26 includes a key pad 36 which key pad may be used by the customer to enter a broad range of information where required such as a personal identification code, money amount or other account information where required.

Figure 2:
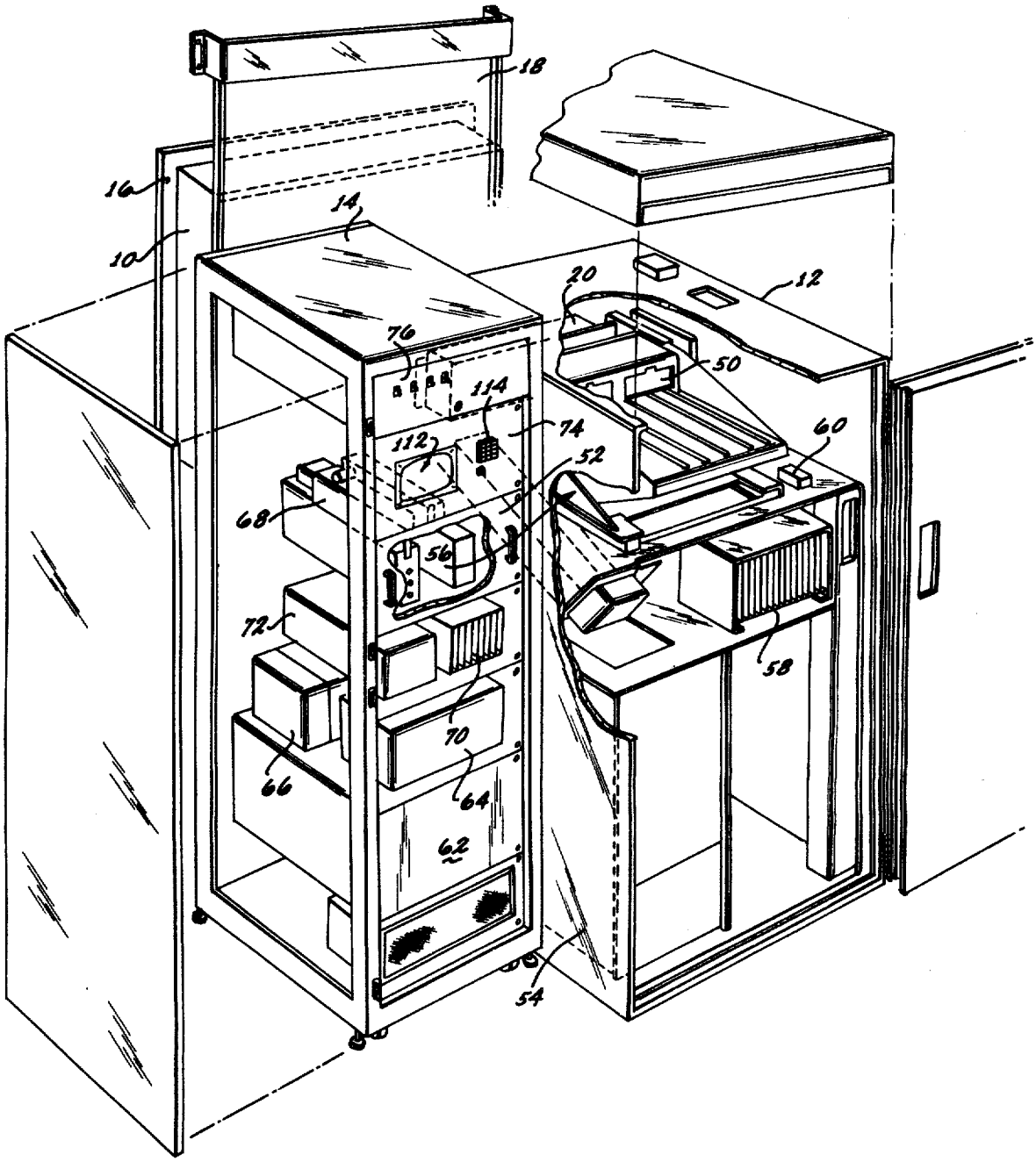
FIG. 2 is a rear perspective view of the customer activated terminal of FIG. 1 showing various components located within the security chest and auxiliary module.

As shown in FIG. 2 the security chest 12 may actually be a large safe which contains those portions of the terminal system which should be maintained in a secure fashion. Specifically, the security chest 12 may include a cash dispensing mechanism 50 which is coupled to the cash delivery mechanism 20, the front of which is shown in FIG. 1, so that when money is dispensed by the dispensing mechanism 50 the money may be presented to a customer by the cash delivery mechanism 20. The security chest 12 also includes a depository mechanism 52 which receives deposits from the deposit slot 22 shown in FIG. 1 and with the deposits then transported into a depository bin 54. The depository mechanism 52 may include a printer and with the depository mechanism and deposit printer controlled by appropriate electronics 56 to control the receipt of deposits, to determine when an actual deposit has been made, and to print an identification on each deposit envelope when received.

In addition to the above-described components, the main control electronics for the terminal, such as a microprocessor 58, may be located within the security chest 12. Also, a communications interface 60 which provides an interface between the terminal and the communications link to a central computer may be located within the security chest 12. It can be seen that the components of the system which provide for the main control of the terminal and provide for an interface to a central computer are maintained in a secure location to thereby prevent the functions of the terminal from being tampered with by unauthorized personnel.

Such security provisions are not mandatory to the concept of operation of the terminal and need not be included if the terminal is located in safe environments.

The auxiliary module 14 may contain various components of the system which do not have to be maintained in a secure location. For example, the auxiliary module 14 may include a general power supply 62 for supplying power for most of the components of the terminal. The module 14 may also include an additional power supply 64 and an auxiliary battery 66 for use in supplying power to the microprocessor 58. Other components which may be included within the auxiliary module 14 are a receipt printer 68 which generates a printed receipt which is delivered to the customer through the opening 24 shown in FIG. 1. Also, the control electronics 70 for the printer 68 and a power supply 72 for the printer 68 may also be included within the auxiliary module 14.

In order to provide for servicing of the terminal, the auxiliary module 14 may include a diagnostic monitor and keyboard 74. It can be seen that the diagnostic monitor and keyboard includes a video display 112 and key pads 114 similar to those shown in FIG. 1 and may be used by a technician to diagnose and service any problems within the terminal system.

In addition to the above components, a power distribution system 76 may be included within the auxiliary module 14 so as to provide for the distribution of power from the various power supplies located within the auxiliary module 14 to the other components in the terminal system.

Figure 3:
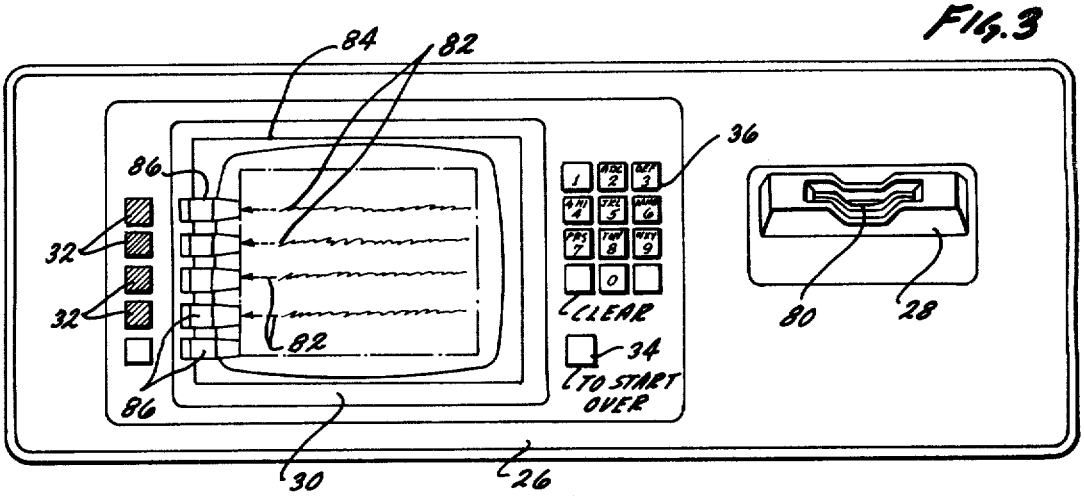
FIG. 3 is a front view of a control and display panel portion of the control and display console.

FIG. 3 illustrates in more detail the control and display panel 26 shown in FIG. 1. As can be seen in FIG. 3 the control and display panel includes the credit card reader 28 which has a slot 80 to receive a credit card. This reader may be used so as to initially authorize a customer to make use of the terminal to perform a transaction. However, it is to be appreciated that the terminal may be authorized for use by other means such as by entering a code number through the key pad 36 or by a combination of the credit card reader 28 and the customer inserting a personal identification code through the key pad 36. It is also to be appreciated that the terminal may be used by banking personnel such as by each teller having a similar control and display panel located in the front of the teller. At that time various means may be used so that the teller gains access to the terminal so as to accomplish particular transactions.

The video display 30 has associated with it the plurality of function selector buttons 32. Specifically five such function selector buttons 32 are shown to the left of the video display 30 and a single dedicated function selector button 34 is provided to the right of the video display 30. Specifically, this single selector button 34 is used to start a transaction over when this is appropriate and is permitted by the terminal. As an example in FIG. 3, the first four of the selector buttons 32 are shown to be shaded to represent that these four buttons are enabled by the control electronics and are also illuminated. It is to be appreciated that any number of the selector buttons 32 may be enabled and illuminated when appropriate to a particular step in a transaction.

Returning to the first four examples in FIG. 3, the first four buttons are enabled and are illuminated so as to be associated with specific text on the video display 30. Each one of the buttons 32 lines up with appropriate text in the display on the video display 30 and arrows 82 may be used to more clearly draw the customer's attention when particular text is associated with a particular button. Surrounding the video display 30 is a bezel 84 and the bezel 84 includes areas 86 which may either have a contrasting color or shape to the remaining portion of the bezel 84 so as to carry the customer's eye from the text to an associated button.

In the example shown in FIG. 3 the customer is given a choice of one out of four possible selections. These four possible selections are represented by lines of text on the video display 30 and four function selector buttons 32 associated with the lines of text are enabled and illuminated. The customer, by depressing one of the four enabled buttons, makes a particular selection and the terminal, on the basis of this selection, proceeds to the next step in the transaction. A number of different transactions each having different steps are described at a later portion of this specification and it will be seen that, depending on the particular step in a transaction, anywhere from none to all of the buttons may be enabled and illuminated.

Before proceeding to descriptions of specific transactions which may be performed by the terminal, a block diagram of the terminal will be described. After that description of the block diagram, a flow chart showing the operation of the terminal in performing transactions will be described with reference to a series of figures illustrating screens presented to a customer during the operation of the terminal.

Figure 4:
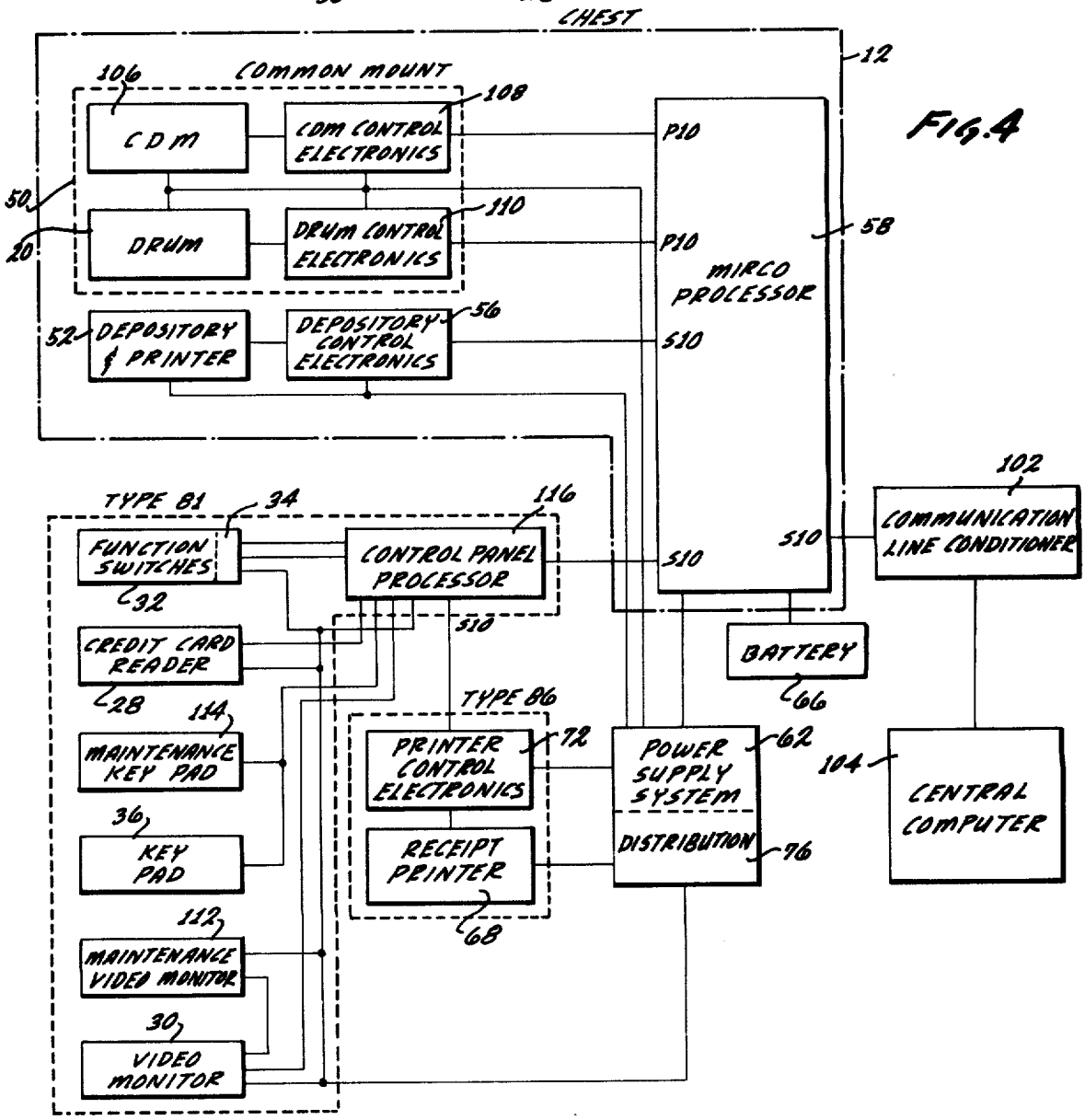
FIG. 4 is a block diagram illustrating the interrelationship of the various components which form the customer activated terminal of the present invention.

Turning first to FIG. 4, a block diagram of the customer activated terminal is shown and those components of the system which had previously been given reference characters are identified with the same reference characters. Specifically, as shown in FIG. 4, the microprocessor 58 controls the operation of the various components of the terminal. The terminal may be coupled to an external central computer and specifically the microprocessor 58 is connected through an appropriate communication line conditioner 102 to an external central computer 104. It is to be appreciated that the terminal can be designed to operate without reference to a central computer but, more normally, the terminal is coupled to the central computer so as to provide for the authorization and updating of customers' accounts as transactions are performed by the use of the terminal. The battery 66 and power supply system 62 may provide for power to the microprocessor 58 and with the distribution of power to the other components in the system provided by the power distribution portion 76.

As described above, the components within the security chest 12 include the microprocessor 58 and additionally include the cash dispensing and deposit receiving components. Specifically, the cash dispenser 50 may include a cash dispensing mechanism 106 under control of control electronics 108. The cash dispensing mechanism 108 supplies cash to a customer through the cash delivery mechanism 20 which is controlled by the cash delivery control electronics 110. The exterior portion of the drum 20 is shown in FIG. 1 and is also shown to be located at the back of the security chest 12 in FIG. 2.

Deposits are received by the depository 52 which depository may include a printer so as to print a deposit number on each deposit. The depository and printer 52 are controlled by the depository control electronics 56.

External to the chest 12 are a number of other components which have also been described above. For example, as shown in FIG. 3, the control and display panel 26 includes the video monitor 30, the function switches 32 and 34 and the kay pad 36 all of which are also shown in FIG. 4. As shown in FIG. 2, the auxiliary module includes a diagnostic monitor 74 which includes the maintenance video monitor 112 and the maintenance key pad 114. In order to provide control of various components forming the control and display panel 26 and the diagnostic monitor 74, a control panel processor 116 is used. The processor 116 may be located within the control and display panel 26. Printer control electronics 72 are also shown in FIG. 4 which electronics 72 control the operation of the receipt printer 68 so as to provide for a receipt to the customer at a particular time.

FIG. 5 is the flow chart which illustrates the operation of the terminal system. The initial steps for all of the transactions to be performed by the terminal are basically the same. The first step of the terminal operation is the provision of a quiescent idle state 200 to indicate to a prospective user that the terminal is ready for use. During the idle state a message is presented to a prospective user as shown in screen A of FIG. 6. In this message the prospective user is presented with an invitation to use the terminal and in addition certain information such as the time and the date are additionally presented and updated on the screen. The message of screen A of FIG. 6 may be displayed with reduced intensity so as to minimize video screen burn problems.

In the message of screen A of FIG. 6, the customer is asked to insert a credit card in the card reader 28 so as to provide for step 202 to activate the terminal. It is to be appreciated that other messages may be used to give different instructions to activate the terminal such as by the entry of a code number through the key pad 36, but the use of a credit card reader ensures a greater security in the use of the terminal. As can be seen in screen A of FIG. 6, the customer is asked to insert the card and then remove it and if the card remains in the reader for more than a predetermined period of time, such as ten seconds, the terminal by step 204 directs the customer by a flashing overlay message as provided by step 206 to remove the card. This overlay message is shown in screen B of FIG. 6 and is added to the text of screen A of FIG. 6.

If the customer removes the card and the card has been successfully read and is a proper card for use with the terminal, the terminal displays a descriptive screen as provided by step 208. The descriptive screen is shown by screen C of FIG. 6 and invites the customer to proceed with the transaction, gives general instructions and then asks the customer to press a particular function button. It will be noted that only the particular function selector button to be depressed is enabled and illuminated by the terminal as represented by the shaded button in screen C of FIG. 6. Additionally an arrow is displayed on the screen extending from the instructions to the particular button. The combination of the above elements greatly eliminates the possibility of the customer depressing the wrong function button since only one button is enabled and illuminated and the customer's attention is directed to this button by the arrow on the screen. Even if the wrong function button is depressed, this does not affect the operation, since the other four buttons are not enabled by the terminal.

As shown in FIG. 5 after the descriptive screen is presented or shown by step 208 and the customer depresses the appropriate button, a primary transaction screen is presented to the customer as shown by screen D of FIG. 6 and as represented by step 210. This screen offers the customer a primary choice of the type of transaction to be performed by the terminal. The choices are indicated by various types of transactions presented to the customer on the video screen. Adjacent each choice is a corresponding function button and only those buttons which represent a choice are enabled and illuminated. If the customer depresses an unlit button, this choice is ignored since this button is not enabled by the terminal. As a further precaution, the key pad is only enabled when appropriate. It can be seen that of the plurality of buttons shown in screen D of FIG. 6, four of the five buttons are shown as shaded to represent that these buttons are enabled and illuminated and to represent the four choices for the customer. In addition, arrows extend from text representing the individual choices shown on the video screen to the appropriate buttons. The customer then moves on to the next step of a particular transaction by depressing one of the four enabled and illuminated buttons. The four possible transactions are shown as steps 212, 214, 216 and 218 in FIG. 5.

After the choice of one of the four possible transactions 212 to 218, the operation of the system branches off as shown by the flow chart of FIG. 5. It is to be appreciated that many different transactions may be provided and that the use of four transactions as described are descriptive only.

Assuming that the customer depressed the button representing a transfer transaction as shown by step 212, the steps involved in this transaction are shown in FIG. 5 and additionally FIG. 7 illustrates various screens presented to the customer during a transfer transaction. In step 220, screen A of FIG. 7 is presented to the customer to indicate to the customer a selection of a secondary transfer transaction such that the customer is given the choice of transferring between various combinations of a checking account and two types of savings accounts. Specifically, as shown by the text in screen A of FIG. 7, four such choices are possible and four of the five function buttons are enabled and illuminated to indicate to the customer that there is a choice of one of these four and with arrows provided from the individual text on the screen to the appropriate button. As indicated above, this lessens greatly the possibility of an error in the transaction. It should be noted that although the transfer operation has been described with reference to a transfer between the accounts of the same customer, the transfer operation may also provide for a transfer between accounts of different customers or for the paying of bills. This is accomplished by programming screens and selections for these alternatives.

Assuming that the customer chooses to transfer monies from his day to day savings account to his checking account by depressing the appropriate button, the terminal actuates this choice as shown by steps 222, 224 and 226 and additionally presents a screen to the customer as shown by screen B in FIG. 7 which is step 228. This step in the operation is a request to the customer to enter the amount of money which is to be transferred. As the customer enters the amount of money to be transferred to the key pad 36, the amount is immediately displayed in the position as shown in Screen B of FIG. 7.

It can be seen that in both screen A and screen B of FIG. 7 the customer is also given the choice of starting over if an improper button was pressed. For example, if the customer has pressed the transfer button in screen D of FIG. 6 and it was then determined that the customer did not want to perform a transfer transaction then, as shown in screen A of FIG. 7, the start-over button could be depressed to return the terminal to the idle state of step 200 as shown in screen A of FIG. 6. Also, in screen B of FIG. 7, the start-over button may be depressed to return the terminal to the idle state. Any time a start-over is appropriate, the start-over button may be enabled and this is indicated to the customer by illuminating the start-over button as shown by the button being shaded. If the customer makes an error in the entry on the key pad 36, then the erase button, which is part of the key pad 36, may be depressed which would erase the number entered and a new number could be entered.

After the customer enters the amount to be transferred as shown in screen B of FIG. 7, then the customer is asked to press the last function button which is enabled and illuminated so as to advance through step 230 to step 232 which step 232 is represented by screen C of FIG. 7. The main purpose of screen C of FIG. 7 is to elicit from the customer a personal identification code. Specifically, this code must be inserted through the key pad 36. In addition, screen C of FIG. 7 could also indicate to the customer the amount to be transferred and the accounts involved in the transfer.

In order to indicate to the customer the number of digits which have been entered for the personal identification code, a separate asterisk may be displayed on the video screen each time a digit is pressed. It is not desirable to display the actual identification code on the screen since this is a number personal to each customer and should be maintained in secret. If the customer enters either too few or too many digits for the code, a flashing screen such as screen D of FIG. 7 is overlaid on screen C. This screen tells the customer that he has either pressed too few or too many keys. As shown in screen D of FIG. 7 too few keys are indicated and too many keys may be indicated by substituting the word "many" for "few". The customer can look at the number of asterisks as some indication whether more or less digits are required.

If the customer does not enter a personal identification code or if the customer enters a code which has the right number of digits but is an invalid code, then a message as shown in screen E of FIG. 7 is presented to the customer. This screen replaces screen C and as long as the customer does not enter a valid personal identification code, no further steps in the transaction can be performed. The additional use of the personal identification code prevents the unauthorized use of a customer's credit card since, in addition to the credit card, the user must also have the proper personal identification code corresponding to that particular credit card. If a personal identification code is not entered into the terminal after a predetermined period of time, then the terminal is returned to the idle state.

As shown in FIG. 5, prior to the entry of the personal identification code in step 232, there is a determination by the terminal in step 230 whether this is the first transaction performed by the customer, and specifically whether the customer had previously entered a personal identification code. If such a personal identification code had been previously entered, then the entry of the personal identification code for this transaction is bypassed. It can also be seen in FIG. 5 that there are other transactions which require the entry of the personal identification code. For all of these transactions, if there is an error in the entry of the personal identification code, then screens such as screens D and E of FIG. 7 may be used with all of the other transactions. These screens are only shown with reference to a transfer transaction but, as shown in FIG. 5, these screens may also be used with an inquiry transaction or a withdrawal transaction.

As a final step 234 in the transfer transaction, a display synopsis screen, as shown in screen F of FIG. 7, is presented to the customer. The text of screen F displays a synopsis of the transaction of two of the function buttons are enabled and illuminated to represent a choice for the customer of either terminating the use of the terminal or going on to an additional transaction. As with the other screens where a customer is invited to either press a particular function button or to press one of a number of function buttons, only those buttons which are illuminated are enabled and in addition arrows are displayed on the screen extending from particular text to indicate the buttons corresponding to the choice represented by that text.

It should also be noted that the individual function buttons are not limited to a specific function, since depending on the step in the transaction, the text on the screen determines what, if any, function an individual function button may have for that step. Therefore, the terminal system has great flexibility since any of the buttons or any group of the buttons may be enabled and illuminated to correspond to particular choices for the customer. Any button or any group of buttons may be enabled and illuminated at any position. For example, in screen C of FIG. 6 and screens B, C and E of FIG. 7, the last button is enabled and illuminated to advance the transaction to the next step upon the depressing of that button. However, in screen D of FIG. 6 the first four buttons are enabled and illuminated and in screen A of FIG. 7 the last four buttons are enabled and illuminated and in both cases the customer may choose any one of the four enabled and illuminated buttons. In screen F of FIG. 7, the last two buttons are enabled and illuminated to give the customer one of two choices. When the step in the transaction does not require a selection of any button, then none of the buttons are enabled and illuminated and if a button is depressed, this has no effect in the transaction since no button was enabled. It can be seen, therefore, that the provision of enabling and illuminating the appropriate ones of the function buttons provides for great versatility in the use of the terminal.

Furthermore, since the video screen text and function, button enabling and illumination are under microprocessor control, they can be easily reprogrammed to revise or enhance the terminal capability.

Turning to FIG. 8, the various screens illustrate an inquiry transaction. Step 236 presents screen A of FIG. 8. In this screen all five of the function buttons are enabled and illuminated so that the customer can inquire about any one of five different types of accounts. It should be noted that although the inquiry operation is described with reference to an inquiry by a user of the terminal in regard to the user's account, the inquiry operation is not so limited. For example, if the terminal is used by bank personnel, inquiry may be expanded to the accounts of many customers or operations of the band. Also, if the terminal is located in a retail establishment, the inquiry operation may provide for additional functions such as credit authorization. Assuming that the customer wishes information about his day-to-day savings account, the second button is depressed to advance to step 238 where screen B is presented for view to the customer. This screen presents a secondary account selection so that the customer has a choice of inquiring about the current balance or the interest paid this year on his day-to-day savings account. In screen B of FIG. 8, two of the function buttons are enabled and illuminated and assuming the customer wishes to know his current balance then the first of these buttons is depressed to advance through step 240 to step 242 which is the presentation of screen C in FIG. 8. Step 240 is similar to step 230 described above. In screen B of FIG. 8, the personal identification code of the customer is elicited in a manner similar to screen C of FIG. 7 and as indicated above screens D and E of FIG. 7 might also be presented in the inquiry transaction at appropriate times.

In addition to eliciting the personal identification code, screen C also identifies to the customer that the inquiry relates to the day to day savings account. If the personal identification code is properly entered, then the last button as shown in screen C of FIG. 8 is depressed to advance to step 244 to present screen D of FIG. 8. Screen D of FIG. 8 is a display response and indicates to the customer the information representing the answer to the inquiry. The last two of the function buttons are additionally enabled and illuminated so that the customer now has a choice as to whether the transaction is to be terminated or whether the customer wants to go on to an additional transaction.

FIG. 9 illustrates a series of screens representing a deposit transaction by the customer. In step 246, screen A of FIG. 9 is presented to the customer to elicit the entry of a dollar amount which is to be entered through the keyboard and which represents the amount to be deposited. The dollar amount are displayed as entered and after entry the customer depresses the last button which has been enabled and illuminated. The transaction now advances to step 248 where screen B of FIG. 9 is presented to the customer. This screen gives further instruction for the deposit and specifically indicates to the customer that the deposit is for a particular amount. Screen B also indicates to the customer that the customer should have a deposit slip and the deposit should be made in the deposit mechanism 22 in the console.

The depository 52 as shown in FIG. 2 includes a detector for detecting the presence of a deposit envelope and if such a deposit envelope is detected then the terminal advances to step 250 where screen C of FIG. 9 is presented to the customer. This screen is a display synopsis and indicates to the customer that the deposit has been received. Additionally screen C requests whether any further transaction are to be performed by enabling and illuminating the last two function buttons. If no deposit envelope was detected, such as after a predetermined period of time, then a screen such as screen D of FIG. 9 is presented to indicate to the customer that no deposit was received. Screen D also inquires whether the customer wishes to perform an additional transaction. Again, the last two buttons are enabled and illuminated to make this last inquiry.

FIG. 10 represents a cash withdrawal transaction and illustrates a number of screens which may be presented to the customer representing various steps in the cash withdrawal transaction. It is to be appreciated that although the cash dispensing operation is described with reference to the dispensing of cash, this operation may also be used to dispense other forms of funds such as travelers checks or cashiers checks. In the first step 252 of the cash withdrawal, screen A of FIG. 10 is presented to provide for a selection of the source of the funds to be withdrawn. For example, two choices are presented and two corresponding buttons are enabled and illuminated. These choices represent the withdrawal from either a checking or a savings account. As shown in screen A of FIG. 10, the second and third buttons in the group of function buttons is enabled and illuminated. Once the particular account from which the money is to be withdrawn is selected, then the transaction advances to step 254 where screen C of FIG. 10 is presented to the customer. Screen B allows the customer to select the amount of money which the customer wants to withdraw. In screen B all of the function buttons are enabled and illuminated with the first four representing increasingly larger amounts of money to be withdrawn and with the fifth button representing an amount greater than the amounts indicated by the first four buttons. If an amount greater than those presented in screen B of FIG. 10 is required, then the last button is depressed and a screen such as screen C of FIG. 10 is presented to the customer. Screen C represents a selection of a larger dollar amount than possible with screen B. It is to be appreciated that amounts different from those shown on screens B and C may be presented to the customer, or the terminal may provide for the customer actually entering a desired amount for withdrawal through the key pad 36. In such a case, the cash dispensing mechanism must be sophisticated enough to handle odd amounts of money. A simpler system is as shown by screens B and C of FIG. 10 where the customer can only select from predetermined amounts.

After the customer selects the amounts from either screen B or C of FIG. 10, the transaction advances to step 256 where screen D is presented to the customer. Screen D of FIG. 10 elicits the personal identification code from the customer to be entered through the key pad 36 and if an improper entry of the personal identification code is made, then screens such as screens D and E of FIG. 7 may be presented to the customer. Assuming the customer enters the proper personal identification code and then activates the last function button which is enabled and illuminated as shown in screen D of FIG. 10, then the terminal advances to step 258. For step 258 the cash dispensing mechanism 50 dispenses cash through the cash delivery mechanism 20 to be dispensed to the customer at the front of the console 10. After the cash is dispensed the terminal advances to step 260 where screen E of FIG. 10 is presented to the customer. Screen E indicates to the customer that a particular amount of money has been dispensed from a particular account. If the customer does not remove the money within a particular period of time, this is sensed such as by a sensor and a flashing overlay message, such as shown in screen F of FIG. 10, is presented to the customer. It can be seen that the flashing overlay indicates that the customer is to remove the cash from a particular location on the console. The customer may now choose whether to terminate the use of the terminal or to go on to an additional transaction through the choice of one of the two enabled and illuminated buttons as shown in screen E of FIG. 10.

At the end of any of the four types of transactions as shown in FIGS. 5, 7, 8, 9 and 10, the customer is given the option of doing additional transactions. This is shown in screen F of FIG. 7, screen D of FIG. 8, screen C of FIG. 9 and screen E of FIG. 10. As shown in FIG. 5, if the customer requests additional transactions as represented by step 262, then the terminal returns to screen D of FIG. 6 so that the customer may now choose from one of the four types of transactions which are provided by the terminal. If, however, the customer does not wish to perform any additional transaction, then a final series of steps is performed and additional screens are presented to the customer as shown by the screens illustrated in FIG. 11. In step 264, the terminal first determines whether any of the transactions are receiptable and if not then the terminal immediately advances to step 266 and presents a screen such as screen A in FIG. 11. This screen thanks the customer and after a predetermined period of time the terminal automatically returns to the idle state and presents the message such as shown in screen A of FIG. 6.

If, on the other hand, the customer performed at least one transaction which is receiptable then, as shown in step 268 in FIG. 5, the terminal advances to present a screen such as shown in screen B of FIG. 11 where the customer is asked if he wishes a receipt. The customer responds to this option by depressing one of two enabled and illuminated buttons and if the customer does not want a receipt, then the terminal immediately advances to step 266 to present the display as shown in screen A of FIG. 11. If the customer requests a receipt by depressing the appropriate function button, then the customer is initially presented a screen such as screen C in FIG. 11. Screen C indicates that the receipt is being processed and when the receipt is presented to the customer through receipt slot 24 as shown in FIG. 1, then the terminal advances to step 270 to present screen C of FIG. 11. Screen C indicates to the customer to take the receipt and to thank the customer. After a predetermined period of time, the terminal returns to the idle state to generate the display as shown by screen A of FIG. 6.

FIG. 12 illustrates a number of screens which may be used with any of the transactions and are illustrative of the types of messages which may be presented to the customer during a transaction, or which gives a customer additional choices during a particular transaction. For example, screen A of FIG. 12 may be generated when there is some delay in presenting the next screen in the normal sequence of a transaction. For example, the terminal may have to wait before information can be retrieved from the central computer, or, the terminal may have to wait before information can be transmitted to the central computer. In any of these situations or after delay situations, the terminal may display a message which indicates that the terminal is working on the particular transaction so that the customer does not think that there is a breakdown in the terminal.

Another possible message is as shown by screen B of FIG. 12. If, for example, there is some problem with the receipt printer, this information may be given to the customer. A similar message related to a particular problem could be given to the customer for any of the transactions if there appears to be a problem with a particular part of the terminal system.

Screen C of FIG. 12 may be used when, for some reason, the terminal has not been able to complete a transaction. For example, this could occur if there are delays in transmission or if, for some reason, one of the components did not properly perform a step in the transaction, but it does not appear that there is actually a malfunction in the terminal. At that time, the customer is given the opportunity to try to perform the transaction again and two of the function buttons are enabled and illustrated so that the customer may make this selection.

If, on the other hand, there appears to be a problem with a particular type of transaction, a screen such as screen D of FIG. 12 may be presented to the customer. This indicates that a particular transaction cannot be accomplished because of some failure in the system and the display may even request the customer to call service personnel and give them a number representing a specific type of failure. However, the customer may be given the choice to try to perform a different transaction by the enabling and illumination of two of the function buttons.

It is to be appreciated that the various screens shown in FIG. 12 are illustrative only and that the terminal can present additional informative or instructional screens. It is also to be appreciated that of the various transactions described other alternatives are possible in these transactions. For example, in the transfer transaction shown by the screens of FIG. 7, the transfer has been described with reference to particular accounts but other accounts may be chosen as shown in screen A of FIG. 7. In the inquiry transaction of FIG. 8, the inquiry may be made as to a variety of different accounts as shown in screen A of FIG. 8 and the type of information which may be requested as shown by screen B of FIG. 8 would vary depending on the type of account chosen. In FIG. 10 the withdrawal may be made from one of a number of different accounts as shown in screen A of FIG. 10. Other variations on specific transactions which may be accomplished are also possible and although the invention has been described with reference to particular transaction, it is to be appreciated that various adaptations and modifications and additional transactions may be accomplished.

It can be seen, therefore, that the present invention provides for a sophisticated customer activated terminal which allows a customer to go through transactions in an error free manner. The customer is guided through the transaction by a visual display and with function buttons associated with the visual display and with appropriate ones of the function buttons enabled and illuminated at appropriate times and associated with text on the visual display to allow the customer to make appropriate choices to advance the transaction on a step by step basis. The display may also include arrows which extend from specific text to corresponding function buttons to additionally help the customer make a proper selection through each step of the transaction.

Such capability allows the terminal to be located in non-bank locations providing more convenience of customer access (e.g., retail stores, unattended branch locations, outside walls of buildings).

Although the terminal has been described with reference to it being operated by a customer, it is to be appreciated that the terminal may also be used by bank personnel and that additionally the terminal may be used for other functions other than banking transactions. The visual display associated with the function buttons provides a teaching function so that the user of the terminal is taught the proper steps and with choices provided to the user in such a fashion that the chances of the user making an error are greatly reduced. The enabling and illumination of appropriate ones of the function buttons associated with text on the visual display ensures the user making the choice in a relatively error-proof fashion. It is apparent, therefore, that this combination of function buttons with a visual display may be provided in terminals to accomplish a variety of transactions other than banking transactions. The invention, therefore, is only to be limited by the appended claims.

We claim:

1. A terminal for providing for the performance of transactions by a user on a step by step basis, including, a visual display *formed by an electronic display* for displaying to the user at specific steps in a transaction instructional text to the user for the performance by the user to advance the transaction on a step by step basis *and with this electronic display*

*electronically programmable for modifying the instructional test,* a plurality of function selectors located adjacent the visual display at a position corresponding to the location of particular instructional text on the visual display for selection in the successive steps of individual ones of the function selectors in the plurality to advance the transaction sequentially through the successive steps, the visual display including at particular ones of the steps in transaction instructional text providing for a selection between individual ones of the function selectors in the plurality to advance the transaction to the next steps, means coupled to the function selectors for enabling, at the particular ones of the steps, only the individual ones of the function selectors capable of being selected at such steps, and means responsive to the selection, from the individual ones of the function selectors at each of the particular steps, of a particular one of such function selectors for providing for the performance of individual transaction in accordance with such selection.

2. The terminal of claim 1 wherein each of the function selectors when enabled is also visually indicated.

3. The terminal of claim 2 wherein the visual indication of each function selector is provided by illuminating the function selector.

4. The terminal of claim 2 wherein the visual indication for each function selector is provided by a visual symbol extending from the instructional text at an individual location on the visual display to the function selector.

5. The terminal of claim 4 wherein the visual symbol is an arrow.

6. The terminal of claim 1 wherein the visual display is a video screen.

7. The terminal of claim 6 additionally including a bezel surrounding the video screen and including a plurality of contrasting areas each located adjacent an individual one of the function selectors in the plurality and intermediate the individual function selector and the corresponding instructional text for visually interconnecting the individual function selector and the corresponding instructional text.

8. The terminal of claim 1 including an additional function selector dedicated to a specific function to start over a transaction.

9. The terminal of claim 1 wherein the function selectors are formed as a group of push buttons located along the side of the visual display.

10. The terminal of claim 9 including an additional push button located along another side of the visual display for providing a specific function to start over a transaction.

11. The terminal of claim 9 wherein the individual push buttons when enabled are individually illuminated for providing a visual indication.

12. The terminal of claim 1 additionally including a card reader for initially activating the terminal.

13. The terminal of claim 1 additionally including a dispensing mechanism for dispensing funds to the user of the terminal during particular transactions.

14. The terminal of claim 1 additionally including a depository for receiving deposits from the user during particular transactions.

15. The terminal of claim 1 wherein the visual display during particular transactions provides for information or authorization requested by the user.

16. The terminal of claim 1 wherein the terminal during particular transactions provides for the transfer of monies.

17. The terminal of claim 1 additionally including a key pad for the entry of information by the user during particular transactions.

18. A terminal for providing for the performance of transactions by a user on a step by step basis, including a visual display *formed by an electronic display* for displaying to the user at specific steps in a transaction instructional text for use in advancing the transaction on a step by step basis *and with this electronic display electronically programmable for modifying the instructional test,* a plurality of function selectors located adjacent the visual display for selection in the successive steps of of individual ones of the function selectors in the plurality to advance the transaction sequentially through the successive steps, each selector corresponding in location to a location for particular instructional text on the visual display.

the visual display including, at a particular one of the steps in a transaction, instructional text in at least two locations for providing for a selection by activation of one of at least a particular one of the function selectors in the plurality to advance the transaction to the next step, means for illuminating at least the particular pair of the function selectors capable of being selected in the particular one of the steps in the transaction, and means responsive to the selection of an individual one of the selectors, from at least the particular pair being illuminated in the particular step in the transaction, for providing successive transactions in accordance with such selection.

19. The terminal of claim 18, including means for enabling the individual function selector when the individual function selectors are illuminated.

20. The terminal of claim 18 additionally including a visual symbol disposed on the visual display and extending from the instructional text at an individual location on the visual display to the corresponding one of the illuminated function selectors in the plurality.

21. The terminal of claim 20 wherein the visual symbol is an arrow.

22. The terminal of claim 18 wherein the visual display is a video screen.

23. The terminal of claim 22 additionally including a bezel surrounding the video screen and including a plurality of contrasting areas each located adjacent a particular one of the function selectors in the plurality and intermediate and the particular function selector and the corresponding instructional text for such particular function selector for visually interconnecting each particular function selector and instructional text for such particular function selector.

24. The terminal of claim 18 including an additional function selector dedicated to a specific function to start over a transaction.

25. The terminal of claim 18 wherein the function selectors constitute a group of individual illuminated push buttons located along one side of the visual display.

26. The terminal of claim 25 including an additional push button located along another side of the visual display for providing a specific function to start over a transaction.

27. The terminal of claim 25, including, means for enabling the individual push buttons when the push buttons are illuminated.

28. The terminal of claim 18 additionally including a card reader for initially activating the terminal.

29. The terminal of claim 18 additionally including a dispensing mechanism for dispensing funds to the user of the terminal during particular transactions.

30. The terminal of claim 18 additionally including a depository for receiving deposits from the user during particular transactions.

31. The terminal of claim 18 wherein the visual display during particular transactions provides for information or authorization requested by the user.

32. The terminal of claim 18 wherein the terminal during particular transactions provides for the transfer of monies.

33. The terminal of claim 18 additionally including a key pad for the entry of information by the user during particular transactions.

34. A terminal for providing for the performance of transactions by user on a step by step basis, including, a visual display *formed by an electronic display* for displaying to the user at specific steps in a transaction instructional text for use by the user in advancing the transaction on a step by step basis *and with this electronic display electronically programmable for modifying the instructional text,* a plurality of function selectors located adjacent the visual display for selection in the successive steps of individual ones of the selectors in the plurality to advance the transactions sequentially through the successive steps, each selector corresponding in location to a location for particular instructional text on the visual display, the visual display including, at a particular one of the steps in a transaction, instructional text in at least two locations for providing for a selection of an individual one of the function selectors in the pair to advance the transaction to the next step, means for providing a visual indication in each step of only those selectors capable of being selected in that step, and means responsive to the selection of an individual one of the function selectors in the particular step for providing for subsequent transactions in accordance with such selection.

35. The terminal of claim 34, including, means for enabling the function selectors when such function selectors are visually indicated.

36. The terminal of claim 34 wherein the visual indication for the individual function selectors is provided by illuminating such individual function selectors.

37. The terminal of claim 34 wherein the visual indication for each individual function selector is provided by a visual symbol extending from the instructional text at the location on the visual display for such individual function selector to such individual function selector.

38. The terminal of claim 37 wherein the visual symbol is an arrow.

39. The terminal of claim 34 wherein the visual display is a video screen.

40. The terminal of claim 39 additionally including a bezel enveloping the video screen and including a plurality of contrasting areas each located adjacent an individual one of the function selectors in the plurality and intermediate such function selector and the corresponding instructional text for such function selector for visually interconnecting such function selector and the corresponding instructional text.

41. The terminal of claim 34 wherein the function selectors constitute a group of push buttons located along one side of the visual display.

42. The terminal of claim 41 wherein the individual push buttons are individually illuminated for providing a visual indication.

43. The terminal of claim 34 additionally including a card reader for intially activating the terminal.

44. The terminal of claim 34 additionally including dispensing mechanism for dispensing funds to the user of the terminal during particular transactions.

45. The terminal of claim 34 additionally including a depository for receiving deposits from the user during particular transactions.

46. The terminal of claim 34 wherein the visual display during particular transactions provides for information or authorization requested by the user.

47. The terminal of claim 34 wherein the terminal during particular transactions provides for the transfer of monies.

48. The terminal of claim 34 additionally including a key pad for the entry of information by the user during particular transactions.

49. A method of providing for the performance of transactions on a terminal by a user on a step by step basis, including the following steps,

*providing an electronic display for displaying instructional text,*

*electronically reprogramming the electronic display for modifying the instructional text,* visually displaying to the user as specific steps in a transaction instructional text for the performance by the user to advance the transaction on a step by step basis, providing a plurality of function selectors located adjacent the visual display to provide for the selection in successive steps of individual ones of the selectors in the plurality to obtain an advance of the transactions sequentially through the successive steps, each selector corresponding in location to a location for particular instructional text on the visual display, visually displaying, at a particular one of the steps in a transaction, instructional text in at least a pair of locations for providing for a selection of an individual one of at least a pair of the function selectors in the plurality to advance the transaction to the next step, enabling only those selectors capable of being selected for the particular one of the steps, and advancing the transaction on the step by step basis in accordance with the selection of an individual one of the at least pair of function selectors in the particular one of the steps.

50. The method of claim 49 wherein each of the function selectors in the plurality, when enabled, is also visually indicated.

51. The method of claim 50 wherein the visual indication is provided by illuminating the individual function selectors.

52. The method of claim 50 wherein the visual indication is provided by a visual symbol extending from the instructional text at each location on the visual display to the location of the corresponding function selector in the plurality.

53. The method of claim 52 wherein the visual symbol is an arrow.

54. The method of claim 49 wherein the function selectors constitute a group of push buttons located along one side of the visual display.

55. The method of claim 54 wherein the individual push buttons when enabled are illuminated for providing a visual indication.

56. The method of claim 49 additionally including the step of initially activating the terminal by a card reader.

57. The method of claim 49 additionally including the step of dispensing funds to the user of the terminal during particular transactions.

58. The method of claim 49 additionally including the step of receiving deposits from the user during particular transactions.

59. The method of claim 49 additionally including the step of visually displaying during particular transactions information or authorization requested by the user.

60. The method of claim 49 additionally including the step of providing for the transfer of monies during particular transactions.

61. The method of claim 49 additionally including the step of entering information by the user during particular transactions.

62. A method of providing for the performance of transactions on a terminal by a user on a step by step basis, including the following steps,

*providing an electronic display for displaying instructional text,*

*electronically reprogramming the electronic display for modifying the instructional text,* visually displaying to the user at specific steps in a transaction instructional text for the performance by the user to advance the transaction on a step by step basis, providing a plurality of function selectors located adjacent the visual display to provide for a selection in the successive steps of individual ones of the selectors in the plurality to obtain an advance of the transactions sequentially through the successive steps, each selector corresponding in location to a location for a particular instructional text on the visual display, visually displaying at particular ones of the steps in a transaction instructional text in at least two locations for providing for a selection of one of at least a pair of the function selectors in the plurality to advance the transaction to the next step, visually indicating in each step only those selectors which are capable of being selected for that step, and providing subsequent steps in the transaction in accordance with the selection of an individual one of at least the pair of function selectors in the particular step.

63. The method of claim 62 wherein the function selector when visually indicated is also enabled.

64. The method of claim 62 wherein the visual indication for each individual function selector is provided by illuminating the individual function selector.

65. The method of claim 62 wherein the visual indication for each individual function selector is provided by a visual symbol extending from the instructional text at an individual location on the visual display to such individual function selector.

66. The method of claim 65 wherein the visual symbol is an arrow.

67. The method of claim 62 wherein the function selectors constitute a group of push buttons along one side of the visual display.

68. The method of claim 67 wherein the individual push buttons when visually indicated are individually enabled.

69. The method of claim 62 additionally including the step of initially activating the terminal by a card user.

70. The method of claim 62 additionally including the steps of dispensing funds to the user of the terminal during particular transactions.

71. The method of claim 62 additionally including the step of receiving deposits from the user during particular transactions.

72. The method of claim 62 additionally including the step of visually displaying during particular transactions information requested by the user.

73. The method of claim 62 additionally including the step of providing for the transfer of monies during particular transactions.

74. The method of claim 62 additionally including the step of entering information by the user during particular transactions.

* * * * *